United States Patent [19]

Maeda et al.

[11] Patent Number: 5,153,861
[45] Date of Patent: Oct. 6, 1992

[54] RECORDING/REPRODUCING DEVICE

[75] Inventors: Shigemi Maeda, Yamatokoriyama; Shigeo Terashima, Tenri, both of Japan

[73] Assignee: Sharp Kabushiki Kaisha, Osaka, Japan

[21] Appl. No.: 450,254

[22] Filed: Dec. 13, 1989

[30] Foreign Application Priority Data

Dec. 29, 1988 [JP] Japan .................. 63-331004

[51] Int. Cl.$^5$ ............................. G11B 7/00
[52] U.S. Cl. ........................ 369/32; 369/33; 369/83
[58] Field of Search ............... 369/32, 30, 33, 56, 369/58, 59, 47, 44.26, 83, 275.3, 24; 360/72.1, 72.2, 8, 27, 13, 135; 358/310, 311, 342

[56] References Cited

U.S. PATENT DOCUMENTS

| | | | |
|---|---|---|---|
| 4,862,439 | 8/1989 | Ando et al. | 369/58 |
| 5,012,461 | 4/1991 | Yoshida et al. | 369/32 |

FOREIGN PATENT DOCUMENTS

| | | |
|---|---|---|
| 0248536 | 12/1987 | European Pat. Off. . |
| 0281415 | 9/1988 | European Pat. Off. . |
| 0288571 | 11/1988 | European Pat. Off. . |
| 0310678 | 4/1989 | European Pat. Off. . |
| 0346979 | 12/1989 | European Pat. Off. . |
| 57-127975 | 8/1982 | Japan . |
| 63-83984 | 4/1988 | Japan . |
| 8808197 | 10/1988 | PCT Int'l Appl. . |

OTHER PUBLICATIONS

The English Abstract of Japanese No. 63-222379; Sony Corp. The Art of Digital Audio; John Watkinson; Jan. 1988; pp. 1 and pp. 441 to 487.

Primary Examiner—Roy N. Envall, Jr.
Assistant Examiner—Hung Dang

[57] ABSTRACT

In a recording/reproducing device in accordance with the present invention, recording or reproducing positions are recognized by using absolute address parts which are predeterminately formed in a rewritable recording medium. Moreover, the device is composed so that the user can easily edit reproducing procedures stored in memory means with respect to each information in the recording medium by using the recording or reproducing positions read from above-mentioned absolute address parts and he/she can also rewrite above-mentioned reproducing procedures edited by him/her in the lead-in region of the above-mentioned recording medium. Accordingly, the user can save trouble to re-enter those reproducing procedures every time he/she places the recording medium in the recording/reproducing device, and once the recording medium having the edited reproducing procedure information recorded in the lead-in area is placed in the recording/reproducing device, successive reproductions of each information according to desired reproducing procedures are easily performed, thereby resulting in an improved operability.

30 Claims, 3 Drawing Sheets

RECORDING/REPRODUCING DEVICE

FIELD OF THE INVENTION

The present invention relates to a recording/reproducing device for recording and reproducing on a recording medium, more specifically on a rewritable disk-shaped recording medium comprising absolute address parts formed therein for providing position information in recording or reproducing on the medium.

BACKGROUND OF THE INVENTION

Conventionally, it was known in the art to provide disc-shaped recording media, so-called compact discs(-hereinafter called CD) wherein digitized music information, etc. are optically recorded and these media have been widely used as information transmitting means used only for reproduction.

As to these CD's used only for the reproduction of music information, a plurality of music programs (hereinafter called programs) are successively recorded from inner side to outer side track in an information recording region of the disk, and at the innermost area of the disk, a so-called lead-in area, there is also preset an area called TOC(Table Of Contents) area. In this TOC area, program numbers for identifying each program, recording start positions of each program and the like are predeterminately recorded.

In a conventional reproducing device used only for reproduction, when a CD is placed in the device to reproduce information recorded therein, by reading out the information in the TOC area and storing same at first, the number of programs as well as a recording start position for each program recorded in the CD is recognized. Next, when the reproducing procedures are instructed by the user, the above-mentioned device can execute accesses to desired programs by using the information of the TOC area at high speeds. More specifically, by using the information recorded in the TOC area, the above-mentioned reproduction dedicated device permits carrying out various modes of reproducing such as; a reproduction of any one of programs; or reproductions of a plurality of programs according to an order and the number of times for repeated reproductions instructed by the user; and the like.

By the way, since the above-mentioned CD is used only for reproducing, another type of recording/reproducing device as well as its recording medium which permits the user to freely record music information or the like has been desired to be provided. As one example for the device, a recording/reproducing device employing the magneto-optical disk as the rewritable disk-shaped recording medium.

In order to perform so-called CLV(Constant Linear Velocity) control in this recording/reproducing device using a magneto-optical disk also in recording operation, one mode of the device is suggested, wherein by using signals detected from absolute address parts predeterminately formed on the disk as pit-shaped uneven patterns: a position on the disk is recognized; an access to the unrecorded part of the information recording region on the disk as well as a CLV control at the accessed part is performed; and information can be also recorded in the same signal format that is used in the CD.

Moreover, upon finishing recording of programs, the above-mentioned recording/reproducing device permits the absolute address as information of the recording start position for each program newly recorded in the information recording region in the magneto-optical disk to be recorded in the above-mentioned TOC area in accordance with the program numbers.

By the way, the above-mentioned magneto-optical disk having the capacity of sixty minutes in terms of recording time usually can afford to record about twenty melodies, supposing each recording time of them is about three minutes. In this case, in the recording/reproducing device wherein this magneto-optical disk is employed, the following method is supposed to be applied; wherein reproducing procedures information is stored in memory means of the recording/reproducing device in order to permit the device to automatically perform successive reproductions in accordance with desired reproducing procedures, as is the same function used in conventional reproducing devices used only for reproduction. The above mentioned reproducing procedures information includes that of the program numbers, reproducing orders and reproducing number of times concerning a plurality of desired melodies specified by the user among about twenty programs recorded in the disk.

However, the reproducing procedures information stored in the above-mentioned memory means is reset when the above-mentioned magneto-optical disk is taken out of the recording/reproducing device. The reason is that the same disk is not necessarily placed in repeatedly every time, and the contents of memory stored in the above-mentioned memory means differ in different disks.

Accordingly, a problem arises in that the user has to repeatedly specify the reproducing order, reproducing numer of times, etc. for a program he/she wants to reproduce every time he/she places the disk in the device.

SUMMARY OF THE INVENTION

It is an object of the present invention to provide a recording/reproducing device wherein additional information concerning reproducing procedures, etc. edited by the user is recorded in the lead-in region on a recording medium, and every time the recording medium is placed in the recording/reproducing device, successive reproductions can be performed according to the above-mentioned additional information without any necessity for the user to enter the same additional information repeatedly.

In order to achieve the above-mentioned object, the recording/reproducing device of the present invention employs a rewritable recording medium which comprises an information recording region for recording information therein, a lead-in region for recording additional information therein concerning each information recorded in the information recording region and absolute address parts formed at least in each of the regions for providing absolute addresses as information concerning positions for recording and reproducing. The device is also characterized in comprising memory means for storing additional information therein concerning reproducing procedures etc. for each information recorded in the information recording region on the recording medium and recording means for recording the additional information stored in the memory means in the lead-in region.

With above-mentioned composition, in order to successively reproduce each information recorded in the information recording region including information newly recorded, when additional information with respect to the reproducing procedures etc. for specifying the reproducing order, the reproducing number of times, etc. is entered by the user, additional information is stored in the memory means. Then, immediately before the recording medium is taken out of the recording/reproducing device or at the time that the user specifies it according to the necessity, the additional information stored in the memory means with respect to the above-mentioned reproducing procedures or to identification numbers, recording start position, etc. of the newly recorded information is recorded in the lead-in region by the recording means in accordance with the absolute addresses.

On and after the additional information being recorded in the lead-in region, when this recording medium is placed in the recording/reproducing device, the additional information concerning reproducing procedures, recording start position for each information, etc. recorded in the lead-in region can be read out and stored in the memory means without any necessity for the user to repeatedly the same additional information on preferred reproducing procedures etc. The above-mentioned recording start positions corresponding to respective absolute addresses are compared with actual reproduced positions successively read out from absolute address parts formed on the recording medium, thereby permitting accesses to each information. In this way, successive reproductions for each information are performed according to the above-mentioned additional information.

As is mentioned above, since the recording/reproducing device of the present invention has functions whereby the user can easily edit additional information concerning reproducing procedures, etc. recorded in the lead-in region of the recording medium and can perform successive reproductions for each information according to the additional information, the device saves the user the conventional trouble of entering procedures for reproduction, etc. every time he/she places the recording medium in the recording/reproducing device, thereby resulting in an enhanced operability.

For a fuller understanding of the nature and advantages of the invention, reference should be made to the ensuing detailed description taken in conjunction with the accompanying drawings.

BRIEF DESCRIPTION OF THE DRAWING

FIG. 1 to FIG. 4 show one way of preferred embodiment of the present invention.

DESCRIPTION OF THE EMBODIMENTS

One embodiment of the present invention is described in detail below with reference to drawings, from FIG. 1 to FIG. 4.

The recording/reproducing device of the present invention, which employs a magneto-optical disk as a rewritable recording medium and adopts data formats standardized in CD's, performs recording as well as reproducing music programs (hereinafter simply called programs) as information.

Figure 2:
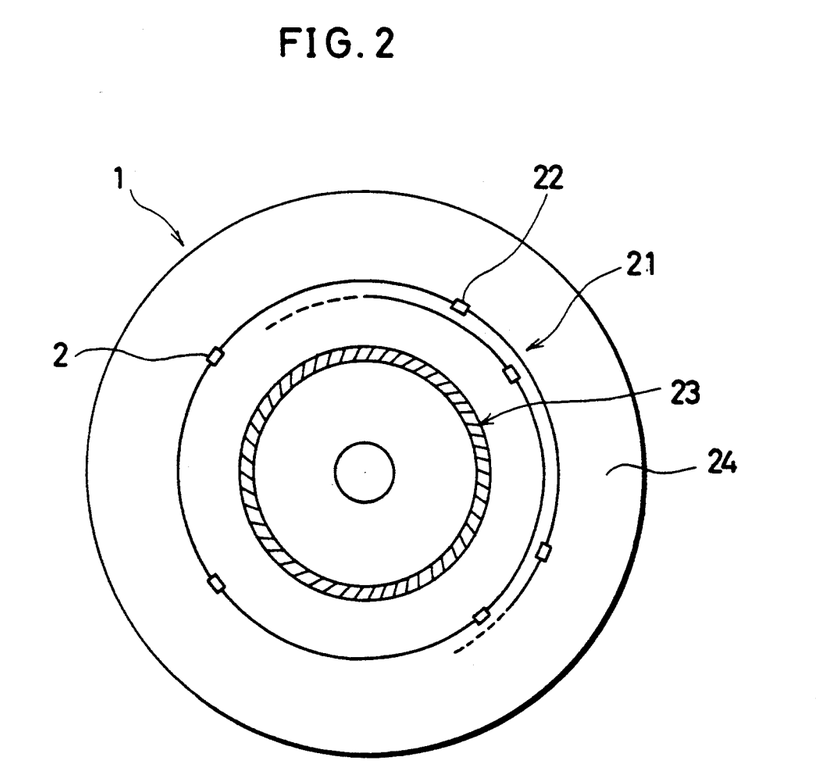
FIG. 2 is a schematic plane view showing an magneto-optical disk.

As is shown in FIG. 2, on one side of a transparent base 20 of a magneto-optical disk 1, there is provided a track 21, for example in spiral shape. On this track 21, as will be mentioned later, there are predeterminately formed absolute address parts 22 in physically uneven pit-like shape with certain intervals.

In the innermost area as well as the outermost area of the above-mentioned track 21, there are respectively formed a TOC area as a lead-in region and a lead-out region (not shown) both of which are made of magneto-optical recording layer (not shown). Between above-mentioned TOC area and lead-in region, there is a program region 24 as an information recording region made of the same magneto-optical layer. In the above-mentioned TOC area 23, additional information can be recoreded concerning program numbers as indetification numbers and recording start positions for each program which have already been recorded or are going to be recorded in above-mentioned program region 24.

Figure 3:
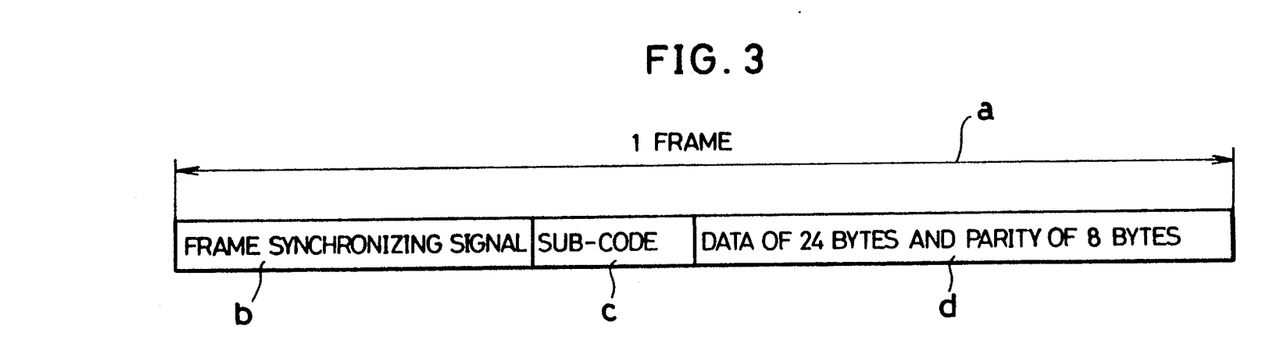
FIG. 3 is a schematic illustration showing a data format of data signals concerning recording information.

Data formats adopted for recording information in the program region 24 and TOC area 23 are the same as those adopted in the conventional CD's used only for reproducing. Accordingly, as is shown in FIG. 3, information a of one frame is composed of a frame synchronizing signal b, a data field d of 24 bytes for programs, etc. with an additional parity of 8 bytes for error detection and correction and a sub-code c for recording program numbers, time information, etc. for each data field d. The above-mentioned information a is successively recorded in the TOC area 23, the program region 24 and the lead-out region. Moreover, in accordance with the present invention, since the recording/reproducing positions for each program in the program region 24 are detected and recognized by absolute address parts 22 (hereinafter the absolute address is defined as the recording/reproducing position for each program detected and recognized from the absolute address parts 22), the sub-code "c" isn't particulary necessary and its contents can be freely set.

Figure 4:
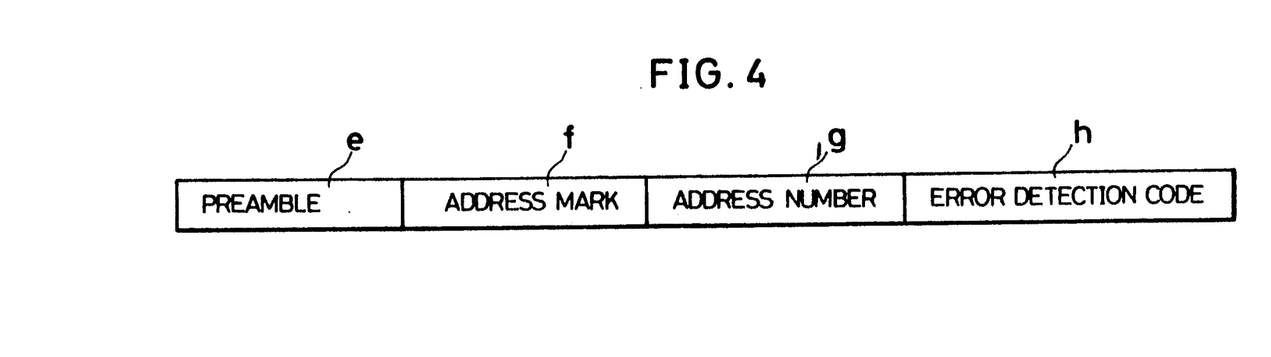
FIG. 4 is a schematic illustration showing a data format of digital signals concerning absolute addresses.

On the other hand, as shown in FIG. 4, each of digital signals detected from the absolute address parts 22 and converted consists of a preamble "e" for reproduction synchronization, an address mark "f" for showing the head of respective absolute address parts 22, and address number "g" for showing each address successively incrementing one by one from the innermost track of the magneto-optical disk 1 (to be concrete, for instance in a magneto-optical disk 1, it shows the time for recording/reproducing every one second from the beginning of program region 24) and an error detection code "h" for detecting errors when the address numbers "g" is detected. The intervals between the above-mentioned absolute addresses 22 to 22 are preset so that each absolute address can be read once every one second to a certain constant linear velocity on the magneto-optical disk in recording or reproducing.

Figure 1:
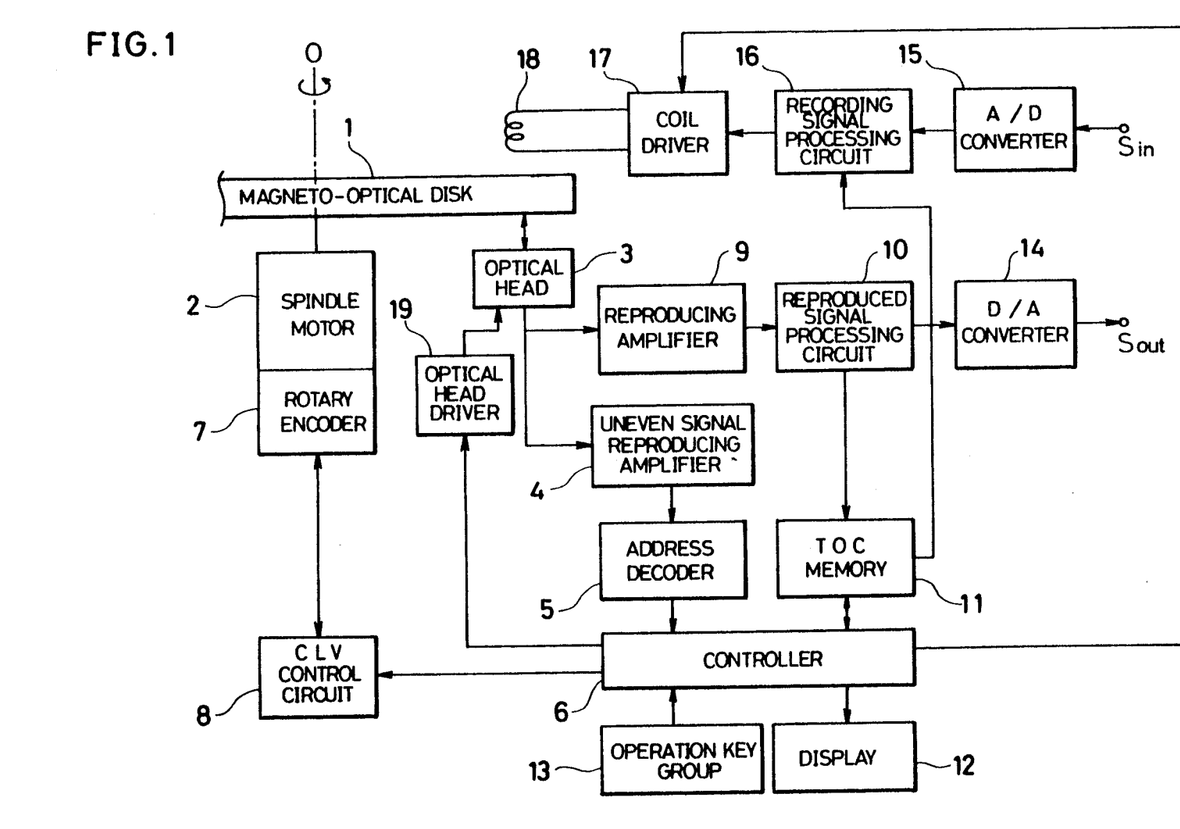
FIG. 1 is a block diagram showing the recording/reproducing device.

FIG. 1 shows one example of recording/reproducing device which performs recording/reproducing in a magneto-optical disk 1.

A/D converter 15 is installed in an input stage wherein analog signals, $S_{in}$ of outside information such as music information, etc. are entered. This A/D converter is composed so that is can convert analog signals, $S_{in}$ entered thereto into digital signals and release the converted digital signals to a recorded signal processing circuit 16 in the following stage. This recorded signal processing circuit 16 is composed so that it can convert the digital signals entered thereto from the A/D converter 15 as well as reproducing precedure signals entered thereto from a TOC memory 11, which will be mentioned later, into recording signals with a format shown in FIG. 3, and can enter the signals to a coil driver 17 connected thereto as the following stage. This coil driver 17 is composed so that it can generate magnetic fields on a magnetic coil 18 corresponding to the variation of the recording signals entered thereto from the recorded signal processing circuit 16, and can also drive the magnetic coil 18 to the recording part of the magneto-optical disk 1. These coil driver 17 and magnetic coil 18 form recording means together with an optical head 3 as well as and optical head driver 19 both of which will be described later.

The magneto-optical disk 1 is rotationally driven by a spindle motor 2 centering the axis o of rotation, as is indicated by arrow in the drawing. Having the magneto-optical disk 1 in-between, the magnetic coil 18 and the optical head 3 are located in the opposite positions so as to record information in an operative relation with the magneto-optical disk 1 being rotationally driven. The magnetic coil 18 driven by the coil driver 17 and the optical head 3 driven by the optical head driver 19 are assembled so that after located to the recording part of the magneto-optical disk 1, they can perform magnet optical recording which will be mentioned later.

The above-mentioned optical head 3 and optical head driver 19 also serve as reproducing means for reproducing information recorded in the magneto-optical disk 1. The optical head driver 19 to which the above-mentioned optical head 3 is secured is assembled so that it can apply light beam from the optical head 3 with output required for recording/reproducing according to instructions from a controller 6, and drive the optical head 3 to the recording/reproducing position for applying the light beam focussed on the specified spot of the track 21. Furthermore, the output of the optical head 3 is entered to a reproducing amplifier 9, and the amplifier 9 amplifies signals corresponding to each program, etc. (hereinafter called audio signal elements) among signals reproduced by the optical head 3. The output of the reproducing amplifier 9 is entered to a reproduced signal processing circuit 10. This reproduced signal processing circuit 10 is composed so that it can extract desired data, sort them and convert them into digital signals again with a data format shown in FIG. 3, after performing an error correction process, if there are any. The output of the reproduced signal processing circuit 10 is entered to a D/A converter 14. This D/A converter 14 is composed so that it can convert digital signal data sequences sent from the recorded signal processing circuit 10 into analog signals, releasing them as analog signals, $S_{out}$.

The output of the optical head 3 is also entered to an uneven signal reproducing amplifier 4. The uneven signal reproducing amplifier 4 extracts and amplifies signals corresponding to those detected from the absolute address parts 22 (hereinafter called uneven signal elements), which are physically formed as pit-shaped uneven patterns, among signals reproduced by the optical head 3. The output of the uneven signal reproducing amplifier 4 is entered to an address decoder 5. This address decoder 5 is assembled so that it can convert amplified uneven signal elements into digital signals with a data format shown in FIG. 4 and recognize the absolute addresses, releasing the information concerning recording/reproducing positions to the controller 6.

A rotary encoder 7 is secured to a spindle motor 2 for rotationally driving the magneto-optical disk 1, and the rotary encoder 7 is assembled so as to release a certain number of pulses every one revolution of the spindle motor 2 according to its revolution velocity to a CLV control circuit 8 which will be mentioned later.

Upon placing a magneto-optical disk 1 on the recording/reproducing device, the controller 6 starts to read out additional information recorded in the TOC area 23, thereby permitting the TOC memory 11 as memory means to store the read-out additional information. Moreover, the controller 6 makes it possible to rewrite the contents of the TOC area 23 in the following occasions; when the recording for programs etc. is finished; immediately before the magneto-optical disk 1 is taken out of the recording/reproducing device; or when the user inputs the instruction to do so at his/her will using an operation key group 13. Furthermore, the controller 6 permits the TOC memory 11 to store additional information concerning reproducing procedures and so on in order to specify the reproducing order, reproducing number of times, etc. of each program entered by the operation key group 13. When the instruction for reproducing is entered by the operation key group 13, the controller 6 reads out the additional information including the above-mentioned reproducing procedures from the TOC memory 11, and stores it in its memory part (not shown). Then, while comparing the additional information with the absolute addresses (actual reproducing positions on the magneto-optical disk 1) successively entered from the address decoder 5, the controller 6 verifies the position of the program to be reproduced, thereby permitting the recording/reproducing device to perform reproducing operation according to the specified reproducing procedures. Moreover, when the reproducing ooperation is carried out according to the reproducing procedures stored in the TOC memory 11, the number, recording start position, elapsed time, etc. of a music program being reproduced are displayed on a display 12 (for example, a liquid crystal display and the like) by the instruction from controller 6, and when instructions from the user are entered using the operation key group 13 at his/her will, the additional information (including reproducing orders, reproducing number of times, etc.) concerning reproducing procedures etc. is also read from the TOC memory 11 and displayed on the display 12 by the controller 6. Furthermore, the controller 6 is composed so that it can enter absolute address information entered from the address decoder 5 to the CLV control circuit 8 installed in the following stage of the above-mentioned rotary encoder 7.

The above-mentioned CLV control circuit 8, while detecting the revolving velocity of the spindle motor 2 by using pulses released from the rotary encoder 7, controls the revolving velocity of the spindle motor 2 so that it may always have a constant linear velocity for the optical head 3 with respect to the magneto-optical disk 1 based on the absolute address provided from the controller 6.

In accordance with the above-mentioned composition, the following description deals with the operation of the recording/reproducing device.

Upon placing a magneto-optical disk 1 on the spindle motor 2, the controller 6, while controlling the optical head driver 19 to locate the optical head 3 thereon over the TOC area 23, gives disk radius positional information in the TOC area 23 to the CLV control circuit 8. In order to always give a constant linear velocity to the magneto-optical disk 1, the CLV control circuit 8 determines a pulse frequency reference value for the rotary encoder 7 corresponding to the revolving velocity of the spindle motor 2 required at the radius position according to the disk radius positional information given by the controller 6. Then, when pulse frequency corresponding to the actual revolving velocity of the spindle motor 2 is entered from the rotary encoder 7, the CLV control circuit 8 controls the revolving velocity of the spindle motor 2 so that the pulse frequency can be equivalent to the pulse frequency reference value. As a result, the linear velocity of the magneto-optical disk 1 is controlled to be always constant.

Accompanying the revolutions of the magneto-optical disk 1, the uneven signal reproducing amplifier 4 extracts uneven signal elements corresponding to information belonging to the absolute address parts 22 among reproduced signals detected by the optical head 3 and amplifies them so as to enter to the address decoder 5. The address decoder 5, while converting the amplified uneven signal elements into digital signals with a data format shown in FIG. 4 and recognizing the absolute addresses, enters obtained information on recording/reproducing positions to the controller 6. Since the controller 6 successively releases accurate radius positional information to the CLV control circuit 8 according to the information on recording/reproducing positions entered from the address decoder 5 in subsequent operations, the magneto-optical disk 1 can be constantly controlled with an accurate linear velocity, whether or not there is information recorded in the program region 24.

The above-mentioned constant control for linear velocity, however, contains some errors because of dispersions of machine accuracy etc. The reason is that since the absolute addresses being read do not necessarily conform to respective actual radius positions accurately, it is difficult for the CLV control circuit 8 to obtain the accurate pulse frequency reference value with respect to the actual radius positions. However, no problems are raised if it is a linear velocity error within which at least absolute addresses formed in actual radius positions can be reproduced and recognized.

Next, in recording programs, analog signals, $S_{in}$ for the programs entered from outside are converted into digital signals by the A/D converter 15 so as to enter to the recorded signal processing circuit 16. The digital signals are converted into those with a certain data format shown in FIG. 3 to form recording signals by the recorded signal processing circuit 16 and are released to the coil driver 17. The coil driver 17 permits the magnetic coil 18 to generate magnetic fields thereon modulated according to the recording signals, and the modulated magnetic fields are applied on the magneto-optical disk 1. At the same time, light beam with a larger output than that in reproducing is applied in spot shape on the magneto-optical disk 1 from the optical head 3. Temperature rise occurs in localized parts on the magneto-optical disk 1 by the application of the light beam, and in the parts where the temperature rise has occurred, magnetic coercive force lowers. In the parts where the magnetic coercive force has lowered, magnetization occurs in the direction of the magnetic fields applied by the magnetic coils 18, thereby permitting the magneto-optical disk 1 to record programs etc. This magneto-optical recording method is generally called magnetic field modulation method, and by using this method, rewriting on the area on which recordings have already been made is possible by overwriting thereon.

On the other hand, in reproducing programs recorded in the program region 24 (see FIG. 2), light beam with a lower output than that in recording is applied in spot shape on the magneto-optical disk 1 from the optical head 3. The applied light beam is reflected on the magneto-optical disk 1 with rotated polarization planes due to magneto-optical effect. The optical head 3 detects the polarized light with the rotated polarization planes according to magnetizing directions recorded in the magneto-optical disk 1, and releases them as audio signal elements to the reproducing amplifier 9. Amplified by the reproducing amplifier 9, these audio signal elements are released to the reproducing signal processing circuit 10. In the reproducing signal processing circuit 10, the amplified audio signal elements, while they are converted into previous digital signals with a certain format in the recording signal processing circuit 16, are processed in order to detect and correct errors, if any. These digital signals are entered to the D/A converter 14 to convert into analog signals, and are released as analog output signals, $S_{out}$.

The following description deals with recording and reproducing in the TOC area 23 of the magneto-optical disk 1.

When a magneto-optical disk 1 is placed on the spindle motor 2, the controller 6 releases control signals to the optical head driver 19 in order to drive the optical head 3 thereon to the TOC area 23. The magneto-optical disk 1 is controlled so as to keep a constant linear velocity in its revolutions, and additional information read out from the TOC area 23 through the optical head 3, reproducing amplifier 9 and reproducing signal processing circuit 10 is stored in the TOC memory 11.

For example, suppose contents shown in Table 1 are recorded in the TOC area 23.

TABLE 1

| Program No. | Recording Start Position |
|---|---|
| 1 | 00'10" |
| 2 | 03'31" |
| 3 | 14'03" |

In Table 1, the recording start position of each program is recorded on units, min.(') and sec.(") according to each absolute address shown by the absolute address parts 22 (hereinafter called absolute address value, which means the value of absolute address shown on units, min. and sec.). The program numbers and recording start positions described in Table 1 are read from the TOC area 23 on the magneto-optical disk 1, and stored in the TOC memory 11. The controller 6 permits displaying the contents of the TOC memory 11 on the display 12. Consequently, the user can recodnize recorded programs, and if he/she wants to reproduce, for example the second melody, he/she can specify the second melody by the operation key group 13, and then the controller 6 decodes signals entered by the operation key group 13, storing the target position in its memory part. Next, the controller 6 reads out absolute address values from the absolute address parts 22 adjacent to the target position, while leading the optical head 3 to the target postion and making the CLV control circuit 8 perform the constant linear velocity control for the magneto-optical disk 1. By comparing these absolute address values being read out with the stored target position, an access is performed toward a position corresponding to an absolute address part 22 (03'31") as the recording start position for the second melody. In this way, an access to a specified program is carried out.

Moreover, while reproducing a program, besides the program number, relative time for each program (elapsed time from the start of reproducing for each program) is displayed on the display 12, by subtracting the value of recording start position stored in the TOC memory 11 from the value of absolute addresses being successively reproduced. Futhermore, a reproducing position using the absolute address value can be displayed, taking a start position of the program region 24 in the magneto-optical disk 1 as a standard during its reproduction.

In this way, the recording/reproducing device of the present invention makes it possible to perform useful displays as well as access operations by using the contents of the TOC memory 11 and the absolute address values successively reproduced and read out from the absolute address parts 22 without any particular necessity for sub-code information obtained from the sub-code c in signals of one frame shown in FIG. 3.

As to rewriting the contents of the TOC area 23, the operation is performed in the following occasions; when the recording for programs etc. is finished; immediately before the magneto-optical disk 1 is taken away from the spindle motor 2; or when the user enters the instruction to do so at his/her will using the operation key group 13. More specifically, in the above-mentioned occasions, the contents of additional information concerning reproducing procedures etc. stored in the TOC memory 11 are changed, and after the additional information for having contents changed is converted into that with a certain data format by the recording signal processing circuit 16, the rewriting for the TOC area 23 is executed by taking the same recording process as mentioned above. Moreover, changes to the memory contents concerning each program in the TOC memory 11 are practically perfomed in any one of the following methods (i) to (iv) except that information is read out from the TOC area 23. In addition, in any one of the methods, (i) to (iii), the contents of the TOC memory 11 are changed during recording of programs to the program region 24.

(i) As to the first method, for example the signal level and elapsed time of programs during recording are monitored while they are in the analog or digital stage, and when they conform to certain conditions, a decision is made in that there is an interval between melodies. Then, the value of the absolute address at the end position of the interval gives itself as the recording start position for the next melody, while the number of the program is incremented, and the revised program number as well as the recording start position is stored in the TOC memory 11.

(ii) As to the second method, when the user decides that there is an interval and specifies the interval by the operation key group 13, the new program number and recording start position are stored in the TOC memory 11 as is the same way mentioned above (i).

(iii) As to the third method, when source signals entered from outside are recording signals from media with the sub-code such as, for example those from CD's, digital audio tapes, etc., the program number, recording start position, etc. for each program are directly entered to the controller 6 by the sub-code and stored in the TOC memory 11.

(iv) As to the fourth method, the method is executed while the recording/reproducing device is in a stand-by state or in reproducing operation, and the method forms a major feature of the recording/reproducing device in accordance with the present invention. When the user enters additional information concerning reproducing procedures etc. for specifying the reproducing order, reproducing number of times, etc. for each program by the operation key group 13, the contents are stored in the TOC memory 11.

As is shown in the above-mentioned methods (i) to (iii), since the memory contents of TOC memory 11 are also changed and written in the TOC area 23 when information is recorded in the program region 24, the user can easily edit the reproducing procedures on optional programs recorded in the above-mentioned program region 24. The information written in the TOC area 23 is rewritable and therefore is freely changeable.

Once the additional information including reproducing procedures stored in the TOC memory 11 is changed by using any one of the above-mentioned methods, in subsequent reproducing operations, the additional information concerning the revised reproducing procedures etc. is recognized by the controller 6. Next, accesses are performed to respective reproducing positions conforming to each program number specified by the reproducing procedures in accordance with absolute addresses successively reproduced by the optical head 3. As a result, the reproducing operation is automatically carried out according to the reproducing procedures stored in the TOC memory 11.

The following Table 2 shows an example of the additional information concerning the reproducing procedures stored in the TOC memory 11, wherein a program number or a value of absolute address, the reproducing number of times for the program and a next procedure number showing the procedure to be taken next are stored in every procedure number.

In the above-mentioned example, at first the procedure number "1" is referred to, and one reproduction for the second melody is performed according to the contents. When the reproduction is finished, the procedure number "2" which is specified by the next procedure number is referred to and the third melody is reproduced once as is specified by the next procedure number. Similarly, the following procedures continue; the sixth melody is successively performed once, the thirteenth twice, the seventh once, the tenth once. Successively, in the procedure number "7", an range from (37'26") to (42'58") as reproducing position specified corresponding to respective absolute address parts 22 is reproduced once. After reproducing the eleventh melody once by the next procedure number "8" and the nineteenth melody once by the next procedure number "9", the contents of the procedure number "1" are referred to again by the next procedure number "1", and further reproductions are repeated in the same procedures. Moreover, as to the access operation to desired reproducing positions, its outline is given in the above embodiments, and therefore the detailed description is omitted.

TABLE 2

| Procedure Number | Program Number or Absolute address Value | Perform. Number of times | Next Procedure Number |
| --- | --- | --- | --- |
| 1 | 2 | 1 | 2 |
| 2 | 3 | 1 | 3 |
| 3 | 6 | 1 | 4 |
| 4 | 13 | 2 | 5 |
| 5 | 7 | 1 | 6 |
| 6 | 10 | 1 | 7 |
| 7 | 37'26" to 42'58" | 1 | 8 |
| 8 | 11 | 1 | 9 |
| 9 | 19 | 1 | 1 |

Contents of the TOC memory 11 shown in Table 2 are recorded in the TOC area 23 of the magneto-optical disk 1, for example as is described in the above-mentioned method (iv), when the user specifies to do so using the operation key group 13. Accordingly, even if the magneto-optical disk 1 is taken out of the recording-/reproducing device, the above-mentioned additional information concerning the reproducing procedures remains recorded in the TOC area 23, and therefore when the magneto-optical disk 1 is placed on the device next time, the additional information concerning above-mentioned procedures are immediately read out and stored in the TOC memory 11, thereby permitting successive automatic reproductions according to the above-mentioned procedures. Accordingly, the user can save a lot of trouble in that it is not necessary to enter information for reproducing procedures again every time he/she places the magneto-optical disk in the recording-reproducing device, and can repeatedly perform successive reproductions for programs according to his/her desired reproducing procedures.

Furthermore, in the above-mentioned embodiment, the description deals with a recording/reproducing device which adopts a data format of CD's, however the present invention is not necessarily restricted to the device, and can be applied to devices which perform recording/reproducing operations on a rewritable recording medium comprising absolute address parts 22, for example to the devices which record/reproduce image information, various data for many kinds of computers, or the like besides music programs.

In addition, in the above-mentioned embodiment, a megneto-optical disk is adopted as a rewritable recording medium, however the present invention is not necessarily restricted to the medium, and can be applied to recording media, for example such as those with recording layers formed of amorphous alloy and performing recording/reproducing by the use of phase change, or magneto-optical cards, digital audio tapes or the like.

Moreover, in the above-mentioned embodiment, the description deals with a method wherein absolute address parts 22 are physically formed having uneven pit-like shape, however the present invention is not necessarily restricted to the method, and therefore another method can be taken wherein recording layers on a recording medium are formed, for example of amorphous alloy and absolute address parts are formed by using phase change between crystalline and non-crystalline structure.

Furthermore, in the above-mentioned embodiment, the description deals with a method wherein reproducing procedure information consists of a combination of programs numbers or absolute address values, reproducing orders and reproducing number of times, however besides those factors the method can include optional procedures specified by the user during reproduction, for example such as temporary stoppage or the like of the device according to the absolute address value.

As is described above, the recording/reproducing device of the present invention employs a rewritable recording medium which comprises an information recording region for recording information therein, a lead-in region for recording additional information therein concerning each information recorded in the information recording region and absolute address parts formed at least in each of the regions for providing information on positions for recording and reproducing. The device is also composed of memory means for storing additional information concerning reproducing procedures, etc. therein for each information recorded in the information recording region on the recording medium and recording means for recording the additional information stored in the memory means in the lead-in region.

In this composition, the contents of additonal information recorded in the memory means can be changed and the recording contents of the lead-in area in the recording medium can be rewritten in the following cases: while information entered to the recording/reproducing device is being recorded in the recording medium, in the case that there remains blank time between one information and the next information; in the case that the user specifies the processes at his/her will using the input means; in the case that recording signals are entered, which have sub-code consisting of information for identification numbers or recording start positions of the information entered to the device: in addition, while the recording/reproducing device is in operation or in a stand-by state; in the case that the user enters additional information concerning reproducing procedures or the like for specifying reproducing orders, reproducing number of times or the like from the input means in order to successively reproduce each information in the information recording region of the recording medium.

Accordingly, the user can easily edit additional information concerning reproducing procedures etc. and also perform successive reproducing for each information according to the above-mentioned additional information only by placing the recording medium having the edited information recorded in its lead-in region in the recording/reproducing device and giving the reproducing instruction.

In this way, the user can save the trouble of entering additional information every time he/she places the recording medium in the recording/reproducing device, and so an enhanced operability of the recording-/reproducing device can be obtained.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included with in the scope of the following claims.

What is claimed is:

1. A recording/reproducing device for a rewritable recording medium, said rewritable recording medium including, an information recording region for storing information, a lead-in region for storing additional information concerning the information stored in the information recording region, and absolute address parts formed in each of the information recording and lead-in regions for providing absolute addresses indicating positions for recording and reproducing; and said recording/reproducing device comprising:

input means for entering instructions and information to operate said recording/reproducing device;

memory means, which utilizes the absolute address parts, to store the additional information in the lead-in region which was read when said rewritable recording medium was placed in said device, the additional information including identification numbers, and recording ranges, which have been recently recorded in the information recording region and other additional information entered externally from an operator for specifying reproducing procedures for the information stored in the information recording region;

recording means for recording the additional information stored in said memory means in the lead-in region on said rewritable recording medium while recording information in the information recording region;

reproducing means for successively reproducing the information recorded in the information recording region according to the additional information for specifying reproducing procedures stored in said memory means;

display means for displaying the additional information stored in said memory means, while also displaying the reproducing positions corresponding to the absolute address parts when reproducing the information stored in the information recording region; and control means for reading the absolute address parts in accordance with the recording and reproducing positions, the additional information stored in said memory means, when said rewritable recording medium is placed into said recording/reproducing device or when the instructions from said input means are entered, and for permitting said recording/reproducing device to perform predetermined operations such as recording or reproducing, said control means including, a controller for controlling an optical head driver serving as said recording and reproducing means so as to apply a light beam with sufficient output for recording to and reproducing from said rewritable recording medium, and for releasing information of recording/reproducing positions to said optical head driver;

wherein said controller rewrites contents of the lead-in region of said rewritable recording medium when recording of the information is finished, immediately before the recording medium is taken out of said recording/reproducing device or when instructions from the user are entered via said input means.

2. The recording/reproducing device of claim 1, wherein said input means includes a group of operation keys with which an operator enters instructions required to operate said recording/reproducing device, information concerning the reproducing order, information concerning the reproducing number of the information stored on said rewritable recording medium, and control information for said control means.

3. The recording/reproducing device of claim 1, wherein said memory means includes a TOC memory which stores identification numbers, recording start positions according to the absolute address parts and the control information necessary to perform a reproducing operation.

4. The recording/reproducing device of claim 3, wherein said TOC memory stores the identification numbers and recording positions according to the absolute address parts during a recording operation when the user enters predetermined instructions to said control means via said input means.

5. The recording/reproducing device of claim 3, wherein said TOC memory stores the identification numbers and recording start positions where the user enters predetermined instructions based on a sub-code.

6. The recording/reproducing device of claim 3, wherein said TOC memory stores the reproducing order and the reproducing number while said recording/reproducing device is in a stand-by state or in a reproducing operation.

7. The recording/reproducing device of claim 1, wherein said recording means includes, a magnetic coil for applying magnetic fields varying according to recording signals onto said rewritable recording medium; and a coil driver for inducing magnetic fields varying according to the recording signals on said magnetic coil.

8. The recording/reproducing device of claim 1, wherein said recording means includes, an optical head for applying a light beam with an output required for recording in a recording part of said rewritable recording medium, and a second optical head driver for driving said optical head to the recording part.

9. The recording/reproducing device of claim 8, wherein said optical head applies a light beam with a higher output then a reproducing light beam to the recording parts of said rewritable recording medium when recording such that a local temperature of the recording parts is raised to a Curie temperature, a coercive force on the recording parts is decreased, and the recording parts are magnetized in a same direction as magnetic fields applied by a magnetic coil in order to perform information recording.

10. The recording/reproducing device of claim 1, wherein said recording means includes, an optical head for applying a light beam with an output sufficient for reproducing in a reproducing part of said rewritable recording medium, and a second optical head driver for driving said optical head to the reproducing part.

11. The recording/reproducing device of claim 10, wherein when said optical head applies a light beam with a lower output than a recording light beam to the reproducing parts of said rewritable recording medium, said optical head detects a polarization with rotated polarization plane according to a direction of magnetization in the reproducing parts of said rewritable recording medium, converts the polarization into electric signals and outputs the electrical signals to a reproducing amplifier for amplifying audio signal elements corresponding to information recorded on said rewritable recording medium and outputs the electric signals to an uneven signal reproducing amplifier for amplifying uneven signal elements corresponding to the information of absolute address parts.

12. The recording/reproducing device of claim 1, said display means including,
    liquid crystal display means for displaying the identification number, the recording ranges, and elapsed time according to the instructions of said control means when the reproducing operation is performed according to the reproducing procedures information.

13. The recording/reproducing device of claim 12, wherein said display means displays additional information read from the lead-in region according to the instructions entered by said input means, regarding the reproducing order, reproducing number of each information.

14. The recording/reproducing device of claim 1, wherein said controller transmits information of recording positions to a coil driver in order to drive a magnetic coil to a recording part.

15. The recording/reproducing device of claim 1, wherein said controller receives information of recording/reproducing positions on said rewritable recording medium from an address decoder which converts uneven signal elements into digital signals having a fixed data format, and recognizes said absolute addresses received from the address decoder.

16. The recording/reproducing device of claim 1, wherein said controller reads additional information recorded in a lead-in region and instructs said memory means to store said additional information when said rewritable recording medium is placed in said recording/reproducing device.

17. The recording/reproducing device of claim 1, wherein said controller reads additional information concerning reproducing procedures from the memory means and stores the reproducing procedures when a reproducing instruction is entered by the input means, and validates the position of information to be reproduced while comparing it with the information of reproducing positions read from the absolute addresses entered from the address decoder, thereby permitting the recording/reproducing device to perform a reproducing operation according to the specified reproducing procedures.

18. The recording/reproducing device of claim 1, wherein said controller reads additional information concerning the reproducing precedure, such as reproducing number for each information according to instructions entered by said input means for permitting said display means to display the additional information.

19. The recording/reproducing device of claim 1, wherein said rewritable recording medium is that of a rewritable disk type or a card type.

20. The recording/reproducing device of claim 19, wherein said rewritable recording medium is a magneto-optical disk to be recorded or reproduced magneto-optically.

21. The recording/reproducing device of claim 1, wherein said rewritable recording medium includes a recording layer formed of amorphous alloy and is provided for recording or reproducing information by using a phase change.

22. The recording/reproducing device of claim 1, wherein said rewritable recording medium is a digital audio tape.

23. The recording/reproducing device of claim 1, wherein each of the absolute address parts has a data format including,
    a preamble for reproduction synchronization,
    an address mark for indicating a head of each absolute address parts,
    an address number for indicating each address which is successively incrementing, beginning from an intermost-track of said rewritable recording medium, and
    an error detection code for detecting errors when the address numbers are not successively incremented.

24. The recording/reproducing device of claim 23, wherein each of the absolute address parts is formed on said rewritable recording medium at such intervals that the address decoder can identify an absolute address once every second according to a constant linear velocity which said reproducing means provides to said rewritable recording medium.

25. The recording/reproducing device of claim 23, wherein each of the absolute address parts are preformed on said rewritable recording medium is physically uneven pit-like shape.

26. The recording/reproducing device of claim 23, wherein each of the absolute address parts are preformed on a recording layer of said rewritable recording medium made of amorphous alloy by using a phase change between crystalline structure and non-crystalline structure.

27. The recording/reproducing device of claim 7, wherein each of said recording signals has a data format of one frame of information including:
    a frame synchronizing signal,
    a data field having data of 24 bytes corresponding to information and an additional parity of 8 bytes for error detection and correction, and
    a sub-code wherein the identification number, and time information, for each of the data fields are recorded.

28. The recording/reproducing device of claim 19, wherein said rewritable disk type recording medium is controlled by constant linear velocity control means so as to have a constant linear velocity to said recording and reproducing means according to radius positional information read from the absolute address parts formed on said rewritable recording medium.

29. The recording/reproducing device of claim 28, wherein said constant linear velocity control means includes a CLV control circuity and a rotary encoder.

30. The recording/reproducing device of claim 29, wherein said CLV control circuit, when the radius positional information read from the absolute address parts formed on said rewritable recording medium is entered therein from said control means, finds a pulse frequency reference value of the rotary encoder at the radius positon, and controls said rewritable recording medium to keep a constant linear velocity to said recording and reproducing means of said rewritable recording medium by setting a pulse frequency of the rotary encoder according to an actual revolving velocity of the rotational driving means equal to the pulse frequency reference value.

* * * * *